United States Patent [19]

Iwamoto et al.

[11] Patent Number: 5,005,086

[45] Date of Patent: Apr. 2, 1991

[54] FOCUS CONTROL APPARATUS HAVING TWO FOCUSING SPEEDS

[75] Inventors: Koji Iwamoto, Tokyo; Kenichi Hamada; Katsuaki Hirota, both of Kanagawa, all of Japan

[73] Assignee: Sony Corporation, Tokyo, Japan

[21] Appl. No.: 318,138

[22] Filed: Mar. 2, 1989

[30] Foreign Application Priority Data

Mar. 4, 1988 [JP] Japan .................................. 63-051294
Mar. 4, 1988 [JP] Japan .................................. 63-051293
Aug. 29, 1988 [JP] Japan .................................. 63-214360

[51] Int. Cl.⁵ .......................................... H04N 3/26
[52] U.S. Cl. ...................................... 358/227; 354/404
[58] Field of Search .................... 358/227; 250/201.6, 250/201.2, 201.4; 354/404, 402

[56] References Cited

U.S. PATENT DOCUMENTS

| | | | |
|---|---|---|---|
| 4,342,905 | 8/1982 | Fujii et al. ......................... | 250/201.6 |
| 4,354,204 | 10/1982 | Kimura .............................. | 358/227 |
| 4,422,097 | 12/1983 | Inuiya ............................... | 358/227 |
| 4,572,642 | 2/1986 | Yamamoto et al. ................ | 354/402 |
| 4,672,456 | 6/1987 | Murai et al. ....................... | 358/227 |
| 4,701,782 | 10/1987 | Duvent .............................. | 358/227 |

FOREIGN PATENT DOCUMENTS 0092850 2/1983 European Pat. Off. .
0269913 11/1987 Japan .................................. 354/404

OTHER PUBLICATIONS

Japanese Patent Abstracts, vol. 10, No. 197 (2253) 7/10/86.
Japanese Patent Abstracts, vol. 10, No. 50 (2107) 2/27/86.

*Primary Examiner*—Joseph A. Orsino
*Assistant Examiner*—Jill Jackson
*Attorney, Agent, or Firm*—Lewis H. Eslinger

[57] ABSTRACT

A focus control system for a video camera determines a first gradient indicative of a change in value of a predetermined frequency component in the video signal for first and second positions obtained from the signal of predetermined frequency component in the video signal sampled at the first lens position and at the second lens position, and determines a second gradient indicative of a change in value of the predetermined frequency component in the video signal for second and third lens positions obtained from the signal of the predetermined frequency component in the video signal sampled at the third lens position point, and the speed of longitudinal movement of the lens is controlled in accordance with changes in the first and second gradients, thereby permitting faster focusing and reducing the amount of overrun of the lens during such focusing.

5 Claims, 7 Drawing Sheets

FOCUS CONTROL APPARATUS HAVING TWO FOCUSING SPEEDS

BACKGROUND OF THE INVENTION

1. Field of the Invention

This invention relates generally to a focus control system and, more particularly, to a focus control system used in a contrast detecting system of a video camera.

2. Description of the Background

In an autofocusing system of the kind used in a video camera, there has been known a system for obtaininq a correct focus position that involves what is called peak detecting control. One such autofocusing system is based on the fact that selected frequency components in the video signal, excluding the DC component, become a maximum at the correct focus position. The frequency components, excluding the DC component, in the video signal are integrated and become the so-called evaluation value data and the lens is then moved to the position at which the evaluation value data becomes a maximum. An example of such a system is described in Japanese Patent application No. 146628/1987. In that kind of autofocusing system, in order to move the lens to the focus position at which the evaluation value data becomes a maximum, several processes must be executed in which the evaluation value data at the front and back lens positions are compared and a discrimination made, in order to determine the point at which the evaluation value data changes from increasing to decreasing; such processes are called peak detecting control.

FIG. 1 represents an example of such an autofocusing system, in which a lens 51 is moved by a lens drive motor 52, and an image obtained through lens 51 is picked up by a CCD image pickup device 53. The output of CCD image pickup device 53 is supplied to a signal processing circuit 54 and a luminance signal Y is extracted. The luminance signal Y is fed through a bandpass filter 55 to a detecting circuit 56, whose output is supplied to an analog-to-digital (A/D) converter 57. The digital output of A/D converter 57 is supplied to an integrating circuit 58, where the output of the A/D converter 57 is integrated over a predetermined area. The output of the integrating circuit 58 then becomes the evaluation value data. The evaluation value data is supplied to a controller 60 that produces a drive signal supplied to lens drive motor 52 through a driver interface unit 61.

Controller 60 controls the position of lens 51 by moving it to the position at which the evaluation value data, which is output from integrating circuit 58, becomes a maximum. As described above, this is peak detecting control being used as an autofocusing system. Such peak detecting control assumes that the relation between the lens position and the evaluation value data can be described by a curve, such as FIG. 2. In FIG. 2, evaluation value data Dn that is obtained at a lens position ln and evaluation value data Dn+1 that is obtained at a lens position ln+1, which is a subsequent continuous lens position relative to the lens position ln, are compared while moving lens 51 in one direction. Lens 51 is moved until the evaluation value data Dn obtained at the lens position ln is smaller than the evaluation value data Dn+1 obtained at the subsequent continuous lens position ln+1.

As shown in FIG. 2, when the lens position moves to the right, the evaluation value data increases until the lens passes through a lens position indicated as 1 focus, at which point the evaluation value data reaches a maximum value Dmax. When the lens passes through the lens position 1 focus, at which the evaluation value data has a maximum value Dmax, the evaluation value data changes in the decreasing direction. Therefore, by performing the peak detecting control such that a discrimination is made to determine whether the evaluation value data Dn and Dn+1 at the two lens positions ln and ln+1 change from increasing to decreasing while moving the lens in one direction, it is possible to determine that the lens has passed through the lens position 1 focus at which the evaluation value data teaches its maximum value Dmax, so that the correct focus position can be derived.

Nevertheless, though this method works in theory there is a situation that occurs in practice wherein a concave/convex portion appears in the evaluation value data curve of FIG. 2 that indicates a variation in the relation between a change in lens position versus a change in evaluation value data. This concave/convex portion of the response curve is due to noise and to the influence of vibrations caused by the person holding the camera, as well as other outside influences on the mechanical structure of the camera and on the electronic components. In the case where such a so-called concave/convex portion occurs in the curve, if the peak detecting control is operated to discriminate whether the evaluation value data at the two continuous lens positions have changed from increasing in value to decreasing in value while moving the lens in one direction, as explained above, there is the distinct possibility that the so-called concave/convex portion will be erroneously thought to be the lens position at which the evaluation value data is a maximum.

For example, as shown in FIG. 3, when evaluation value data Da derived at a lens position la and evaluation value data Da+1 derived at a lens position la+1 are compared, the evaluation value data Da+1 at the lens position la+1 is found to be smaller than the evaluation value data Da at the lens position la. Therefore, upon determining that the evaluation value data at the two successive lens positions changes from increasing to decreasing, it is determined that at this position the lens has passed through the point at which the evaluation value data becomes maximum. An erroneous focus position has then been found.

Therefore, a predetermined threshold value is provided when discriminating whether the evaluation value data at the two successive lens positions changes from increasing to decreasing. In this way, a check is made to determine whether the difference between the evaluation value data at the two lens positions has been reduced by the predetermined threshold value. If such difference exceeds the predetermined threshold value and changes in the decreasing direction, it is determined that the lens has actually passed through the lens position at which the evaluation value data is a maximum.

When using peak detecting control to perform the autofocus operation, the position of the lens at which the evaluation value data is detected as a maximum can overrun or overshoot the actual lens position at which the evaluation value data is the maximum. Therefore, a process to return the position of the lens by only the overrun amount must be performed.

If the amount of overrun that occurs when detecting the lens position at which the evaluation value data becomes a maximum is large, an undesirable oscillation occurs in the video signal on the screen. Therefore, it is desirable to reduce the amount of lens overrun past the actual focus point.

As might be assumed, this overrun amount increases when rotating the lens drive motor 52 of FIG. 1 at a high speed. Therefore, with a view to reducing the overrun amount, it is desirable to reduce the speed of rotation of the drive motor when executing peak detecting control, however, when the lens drive motor is operated at a low speed, the control speed and autofocus system response is slow.

On the other hand, as mentioned above, if a predetermined threshold value is provided when discriminating whether the evaluation value data at the two successive lens positions have changed from increasing to decreasing, it is detected that the evaluation value data has passed through the maximum value only when the evaluation value data has actually exceeded the maximum value and has decreased to the threshold value or less; consequently, the overrun amount increases.

OBJECTS AND SUMMARY OF THE INVENTION

Accordingly, it is on object of the present invention to provide a focus control system that can eliminate the above-noted defects inherent in the prior art.

It is another object of the present invention to provide a focus control apparatus in which a lens drive motor is driven at a high speed until the evaluation value data approaches a maximum value and as the evaluation value data approaches the maximum value the driving motor is driven at a low speed, thereby making the control speed high and at the same time reducing the amount of lens overshoot.

According to an aspect of the present invention, in a focus control apparatus for extracting predetermined frequency components from a video signal and moving a lens to a position at which the predetermined frequency component becomes a maximum, thereby performing focus control, the focus control apparatus may be characterized by features wherein the predetermined frequency component in the video signal can be sampled at points of at last first to third continuous lens positions and a first gradient indicative of a change in value of the predetermined frequency component in the video signal for a change in lens position between the first and second lens position points is obtained. A second gradient indicative of a change in value of the predetermined frequency component in the video signal for a change in lens position between the second and third lens positions is obtained from the signal containing the predetermined frequency component from the video signal sampled at the second lens position point and the signal of the predetermined frequency component in the video signal sampled at the third lens position point. Then, the longitudinal moving speed of the lens is controlled in accordance with changes in the first and second gradients.

In the focus control apparatus according to the present invention, a driving voltage v for the lens drive motor is determined by the following equation:

$$v = (\tan \theta_1 / \tan \theta_0) \cdot v_0 \qquad \ldots (1)$$

where $\theta$ is the angle or slope between successive data points on the evaluation value data curve. Thus, when the lens position is far from the location corresponding to the maximum of the evaluation value data, the lens drive motor is operated at a high speed, and when the lens position approaches the location corresponding to the maximum evaluation value data, the lens drive motor can be operated at a low speed.

DETAILED DESCRIPTION OF THE PREFERRED EMBODIMENTS

Figure 1:
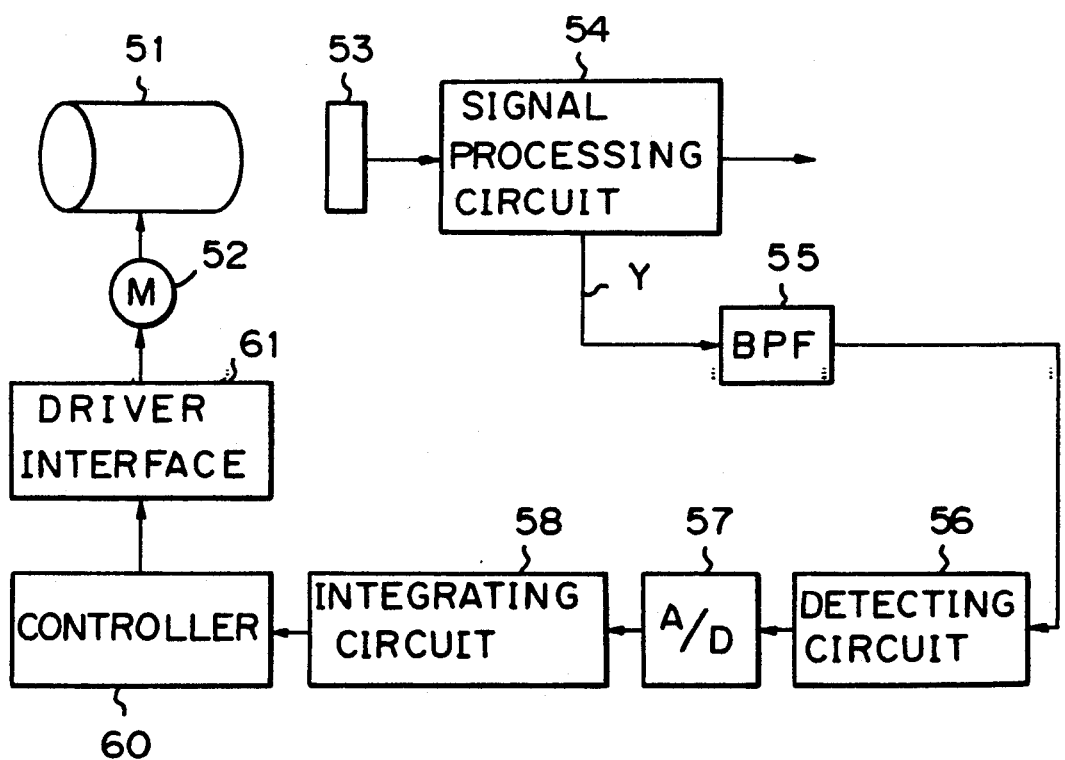
FIG. 1 is a schematic in block diagram form of a proposed autofocusing system.
Figure 2:
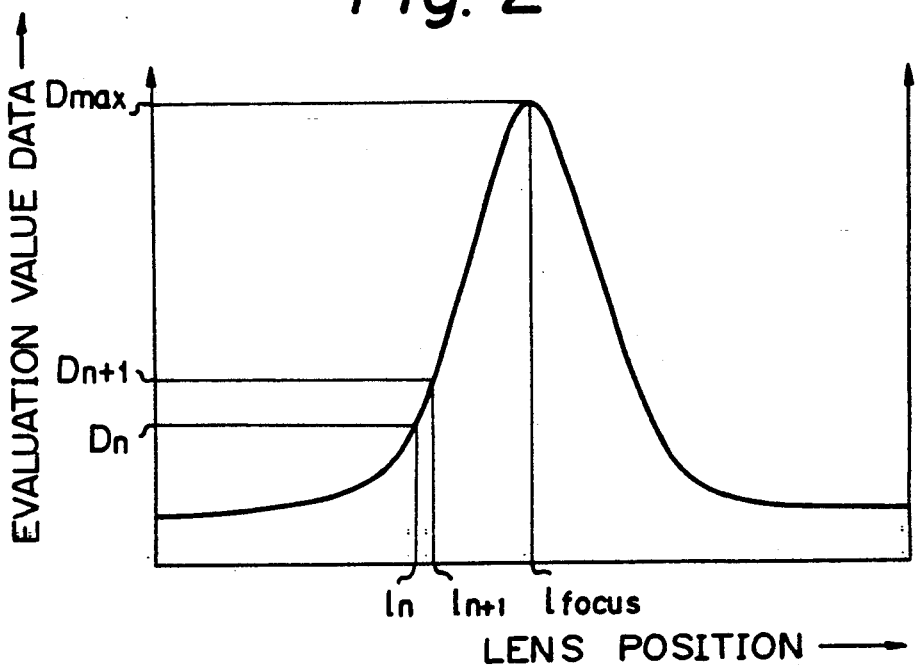
FIG. 2 is a graph useful in explaining the ideal operation of the auto focusing mechanism of FIG. 1.
Figure 3:
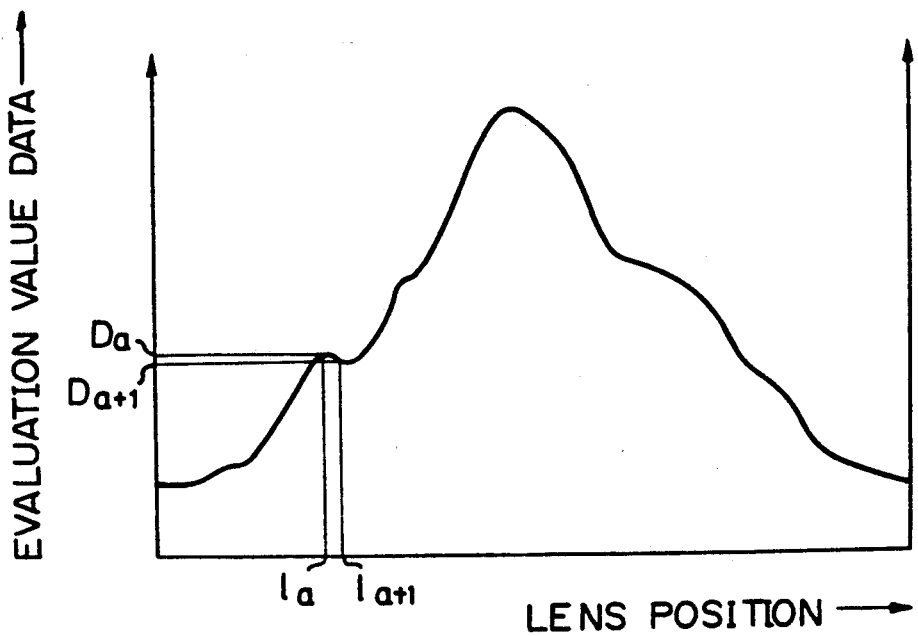
FIG. 3 is a graph similar to FIG. 2 useful in explaining the actual operation of the system of FIG. 1.
Figure 4:
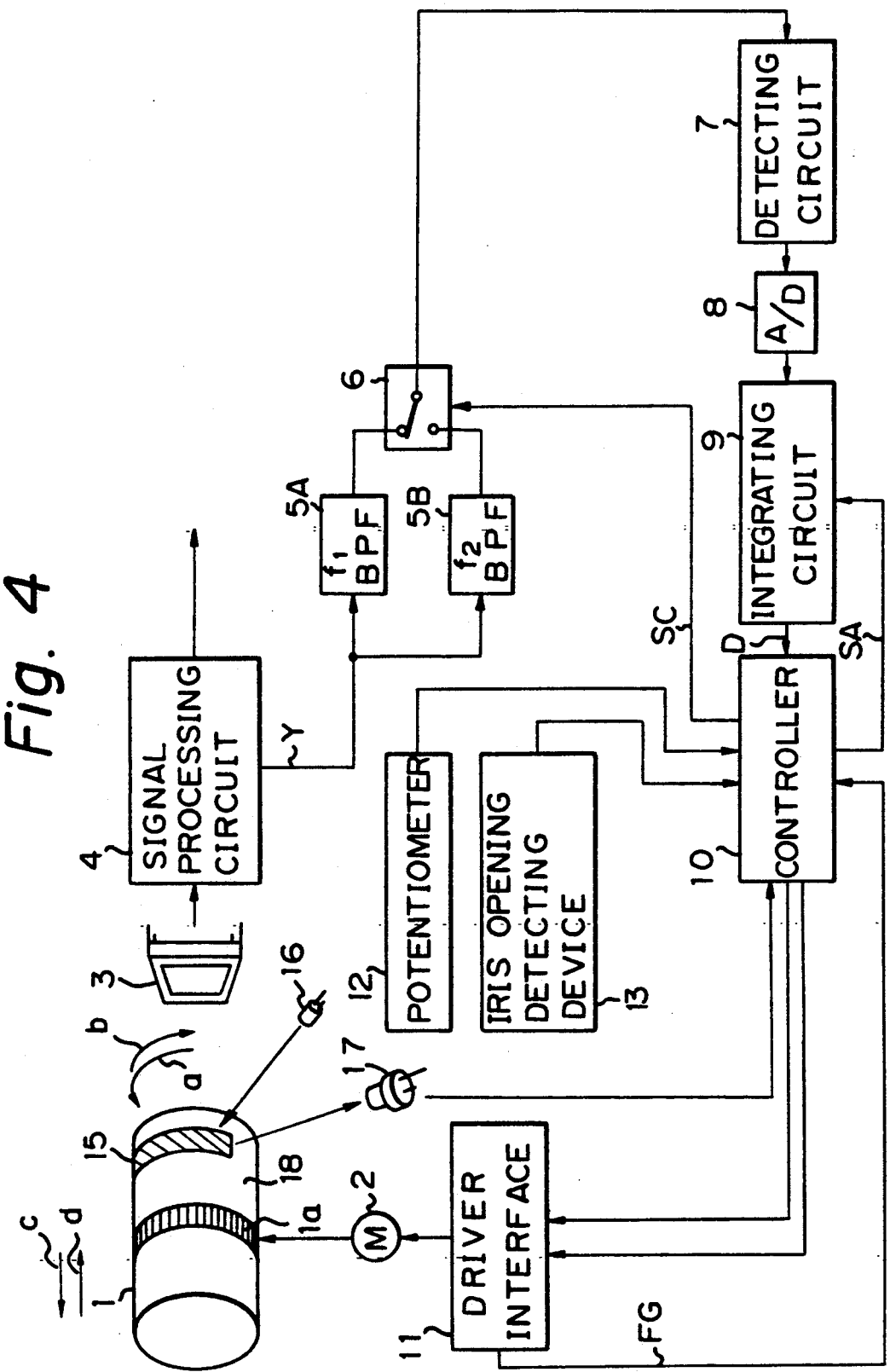
FIG. 4 is a schematic in block diagram form of an autofocusing system according to an embodiment of the present invention.

Referring to FIG. 4, a lens 1 is mounted for rotation in the directions of arrows a and b by a lens drive motor 2 interacting with focus ring 1a, so that by use of suitable mechanical elements, not shown, lens 1 is moved longitudinally in the direction of arrows c and d, and the focus position is controlled. More specifically, when lens 1 is rotated in the direction of the arrow a by drive motor 2, lens 1 is moved in the direction of the arrow c, and lens 1 is focused to the near distance. When lens 1 is rotated in the direction of the arrow b, lens 1 is moved in the direction of the arrow d and lens 1 is focused to the far distance. The image obtained through lens 1 is picked up by a CCD image pickup device 3, and an output signal of CCD image pickup device 3 is supplied to a signal processing circuit 4.

Signal processing circuit 4 operates on the image signal to extract a luminance signal Y and a chroma signal C and it typically includes a processing circuit, a color encoder, and the like. The luminance signal Y extracted by the signal processing circuit 4 is supplied to bandpass filters 5A and 5B. In this embodiment, the passband frequency of bandpass filter 5A is set from 100 kHz to 4 MHz and the passband frequency of bandpass filter 5B is set from 500 kHz to 4 MHz. Thus, signals with only predetermined frequency components are extracted by bandpass filters 5A and 5B from the luminance signal Y output from signal processing circuit 4 and are selectively output through a switching circuit 6.

Switching circuit 6 is controlled in accordance with the image of an object by a switch control signal SC that is output from a controller 10. For example, in the case of the object of strong contrast, the output of bandpass filter 5B is selected and in the case of the object of weak contrast, the output of bandpass filter 5A is selected.

The output of switching circuit 6 is supplied to a detecting circuit 7 where the level of the output from one of bandpass filters 5A or 5B is detected. The output of the detecting circuit 7 is supplied to an analog-to-digital (A/D) converter 8 wherein the portion of the luminance signal Y having predetermined level and predetermined frequency component is digitized.

The output of A/D converter 8 is supplied to an integrating circuit 9 that also receives an integration area control signal SA is supplied from controller 10. The digital data of known level and predetermined frequency component derived from the luminance signal Y is integrated by integrating circuit 9 over an area that is designated by the integration area control signal SA and is supplied as the evaluation value data D to controller 10.

Figure 9:
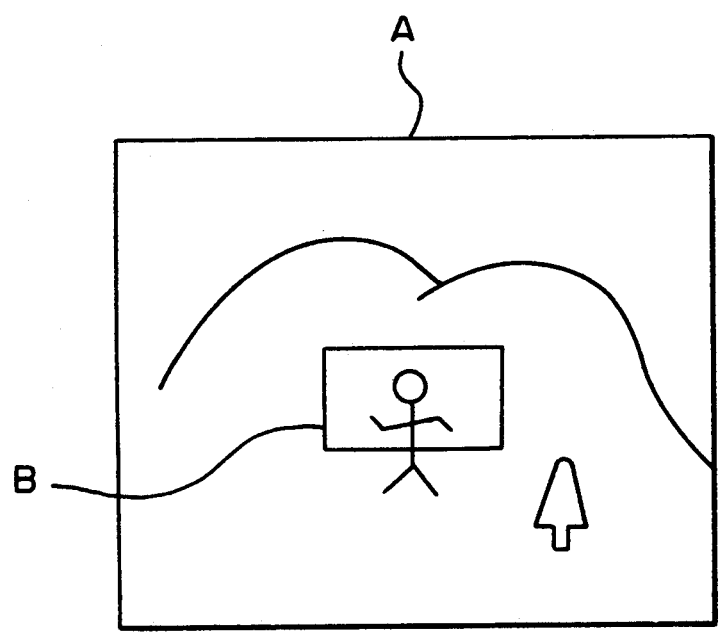
FIG. 9 is a pictorial representation showing the integration area on a typical scene as viewed by a video camera.

FIG. 9 is a pictorial representation of a typical scene A as might be seen by a video camera, and the area over which the signal is to be integrated is shown at B.

Controller 10 controls the position of the lens 1 in accordance with the peak detecting control method by using the evaluation value data D that is output from integrating circuit 9, thereby obtaining the proper focus position of lens 1. The driving signal for lens drive motor 2 is output from controller 10 and fed through a driver interface 11 to lens drive motor 2.

A counter or back electromotive force (EMF) signal is typically generated by lens drive motor 2 in association with its rotation, and the counter electromotive force signal is supplied to controller 10 through the driver interface 11 as a frequency generator (FG) signal used by controller 10 to detect the rate of rotation of lens drive motor 2. The FG signals are counted over a predetermined time and the rotating speed of lens drive motor 2 is detected based on the count value of the FG signals. The detected rotating speed and the rotating speed that is derived are compared and the driving voltage according to the results of the comparison is provided to drive motor 2 through driver interface 11. The FG signal can be also obtained by optical means or magnetic means using any of several well-known approaches.

A potentiometer 12 is mechanically connected to detect the longitudinal position of lens 1 and potentiometer 12 is electrically connected to controller 10. An iris opening detecting device 13 detects the extent or degree of the iris opening and a signal representing the iris opening is supplied to controller 10. When performing peak detecting control by using the evaluation value data D that is output from integrating circuit 9, a coefficient for the evaluation value data D is set by the outputs of potentiometer 12 and iris opening degree detecting device 13.

A reflective film 15 is attached to a part of the outer periphery of the barrel of lens 1 and a light emitting diode 16 and a photodiode 17 are provided to cooperate with reflective film 15. The output of photodiode 17 is also supplied to controller 10. Reflective film 15 is arranged to correspond to a region wherein lens 1 lies within a movable range. The region where lens 1 is out of the movable range corresponds to the remainder of the lens barrel not covered by light reflective tape 15, an area represented generally at 18. When lens 1 lies within the movable range, the output of light emitting diode 16 is reflected by reflective film 15 and the reflected light is received by photodiode 17 and an output signal is produced. When lens 1 is moved so that the edge of reflective tape 15 is out of view of light emitting diode 16, the light from light emitting diode 16 irradiates nonreflective portion 18 of the lens barrel, so that no output is obtained from photodiode 17.

The focusing of lens 1 can be performed by using the evaluation value data D obtained by integrating the data of the level-limited, predetermined-frequency component of the luminance signal Y over a predetermined area, as shown for example at B in FIG. 9. More specifically, when measuring a distribution of the spectrum components and the corresponding intensity in which the focusing state extends from the complete out-of focus state to the in-focus state and back again to the out-of focus state, in the out-of-focus state the spectrum component exists on the low-frequency side and its magnitude is small. As the lens approaches the in-focus state, the spectrum component deviates to the high-frequency side and its magnitude also increases. Due to this, all of the components, excluding the DC component, in the video signal are integrated, and the resultant data can be used as the focus evaluation value D obtained from the output of integrating circuit 9.

Figure 5:
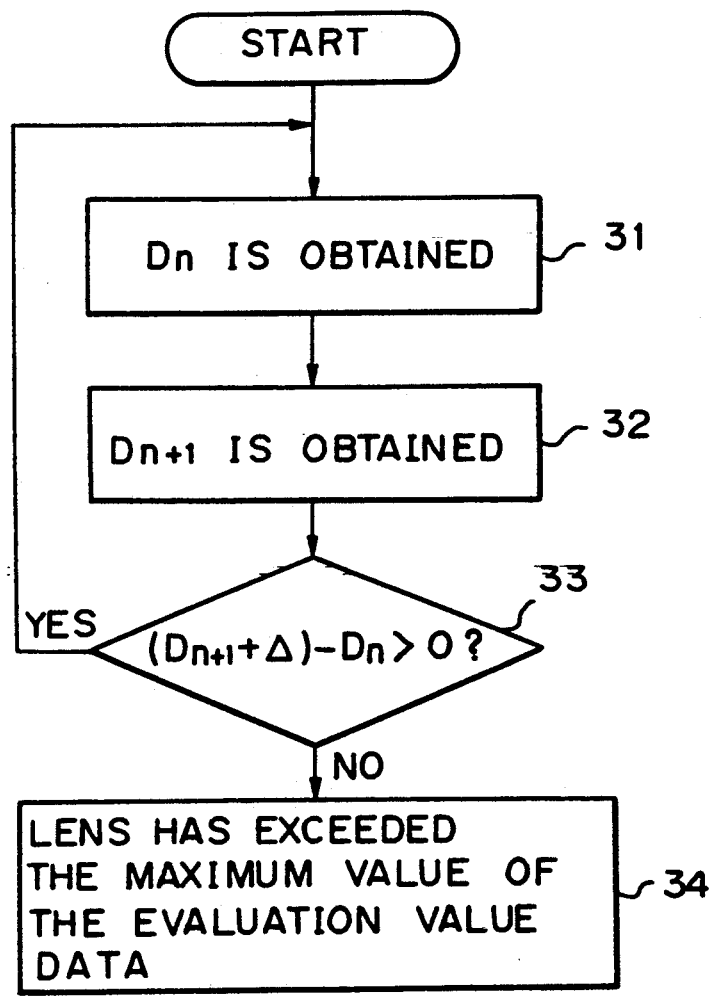
FIG. 5 is a flowchart useful in explaining the operation of a peak detecting control portion of the embodiment of FIG. 4.

The lens position at which the evaluation value data D becomes maximum is searched for in accordance with the peak detecting control method, as represented in FIG. 5. In this fashion, the lens position at which the evaluation value data D becomes maximum is set to be the in-focus position. As shown in the flowchart of FIG. 5, evaluation value data Dn is obtained while moving lens 1 in one direction by lens drive motor 2 in step 31. Thus, evaluation value data Dn+1, which is continuous to the data Dn, is obtained in step 32 by continuing to drive the lens in the same direction. The difference between the evaluation value data Dn and Dn+1 is calculated in step 33 and a check is made to determine whether the evaluation value data has exceeded a predetermined threshold value and has begun to decrease. If evaluation value data Dn+1 is larger than evaluation value data Dn, the lens has not yet reached the position that would result in the maximum value of the evaluation value data. Therefore, the decision in step 33 is YES, and the processing routine returns to step 31, and the driving of lens drive motor 2 continues. When the evaluation value data Dn+1 is found to exceed a predetermined threshold value and is smaller than the evaluation value data Dn, it is determined in step 34 that the lens has gone past the point resulting in the maximum value of the evaluation value data. Threshold value is provided to cope with the case where a so-called concave/convex portion occurs in the curve of the lens position versus evaluation value data. When it is determined that the lens has been moved past the position that would result in the maximum value of the evaluation value data, lens drive motor 2 is driven back by the amount of such overrun.

In the embodiment of the present invention described above, the rotating speed of lens drive motor 2 is controlled in accordance with the curve indicative of the relationship between the change in lens position and the change in evaluation value data. That is, when the lens position is distant from the maximum value of the evaluation value data, lens drive motor 2 is rotated at a high speed. When the lens position approaches the maximum value of the evaluation value data, the speed of rotation of lens drive motor 2 is slowed. Using such control, the peak detecting control can be performed at a high speed and the overrun amount, when it is detected that the lens has assumed a position that exceeds the position that would result in the maximum value of the evaluation value data, can be minimized.

The motor speed is set on the basis of the FG signal derived as described above. More specifically, according to an embodiment of the present invention, the rotating speed of lens drive motor 2 has been set on the basis of the ratio of the gradient of the curve plotting the change in lens position versus the change in evaluation value data at continuous, successive lens positions. When the lens position approaches the maximum value of the evaluation value data, the curve representative of the relation between the change in lens position and the change in evaluation value data gradually becomes flat.

Figure 6:
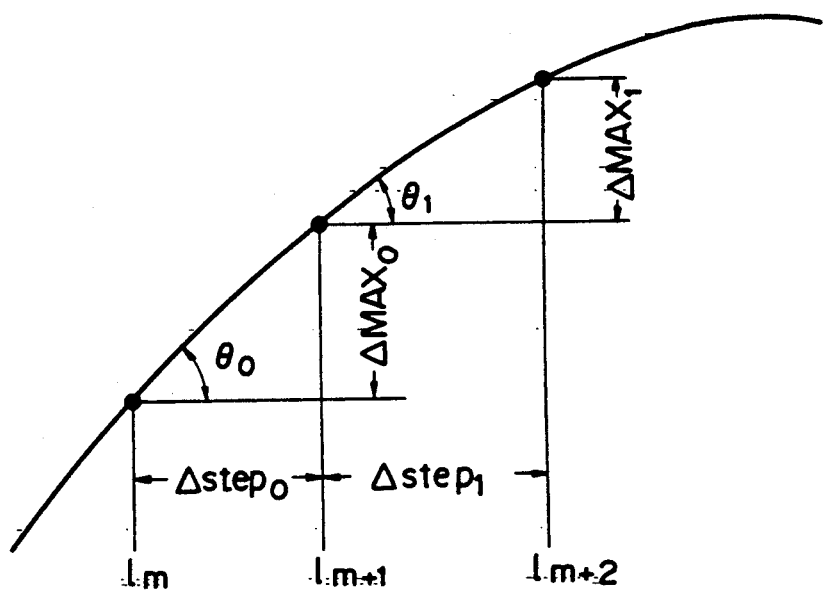
FIG. 6 is a graph useful in explaining the operation of the embodiment of FIG. 4.

For example, as shown in FIG. 6, assuming that at three continuous, successive lens positions lm, lm+1, and lm+2, a gradient of the evaluation value data between the lens positions lm and lm+1 is $\theta_0$ and a gradient of the evaluation value data between the lens positions lm+1 and lm+2 is $\theta_1$, a driving voltage v for lens drive motor 2 is determined by the following equation:

$$v = (\tan\theta_1/\tan\theta_0) \cdot v_0 \qquad \ldots (1)$$

If it is then assumed that the distance the lens moves between positions lm and lm+1 is $\Delta step_0$, then the movement distance between the lens positions lm+1 and lm+2 is $\Delta step_1$, the difference between the evaluation value data at th lens position lm and the evaluation value data at the lens position lm+1 is $\Delta MAX_0$, and the difference between the evaluation value data at the lens position lm+1 and the evaluation value data at the lens position lm+2 is $MAX_1$. In which case, the above equation becomes:

$$= \frac{\Delta MAX_1/\Delta step_1}{\Delta MAX_0/\Delta step_0} \cdot v_0 \qquad (2)$$

$$= \frac{\Delta MAX_1 \cdot \Delta step_0}{\Delta MAX_0 \cdot \Delta step_1} \cdot v_0$$

$$= k \cdot v_0$$

k is calculated by obtaining n such that A in the following equation is equal to 0 and $k = (n/N)$.

$$A = \Delta MAX_1 \cdot \Delta step_0 - (n/N)(\Delta MAX_0 \cdot \Delta step_1) \qquad \ldots (3)$$

where N is a constant to determine the accuracy, and as N increases the analysis quality also increases. A typical value of N is 100.

Figure 7:
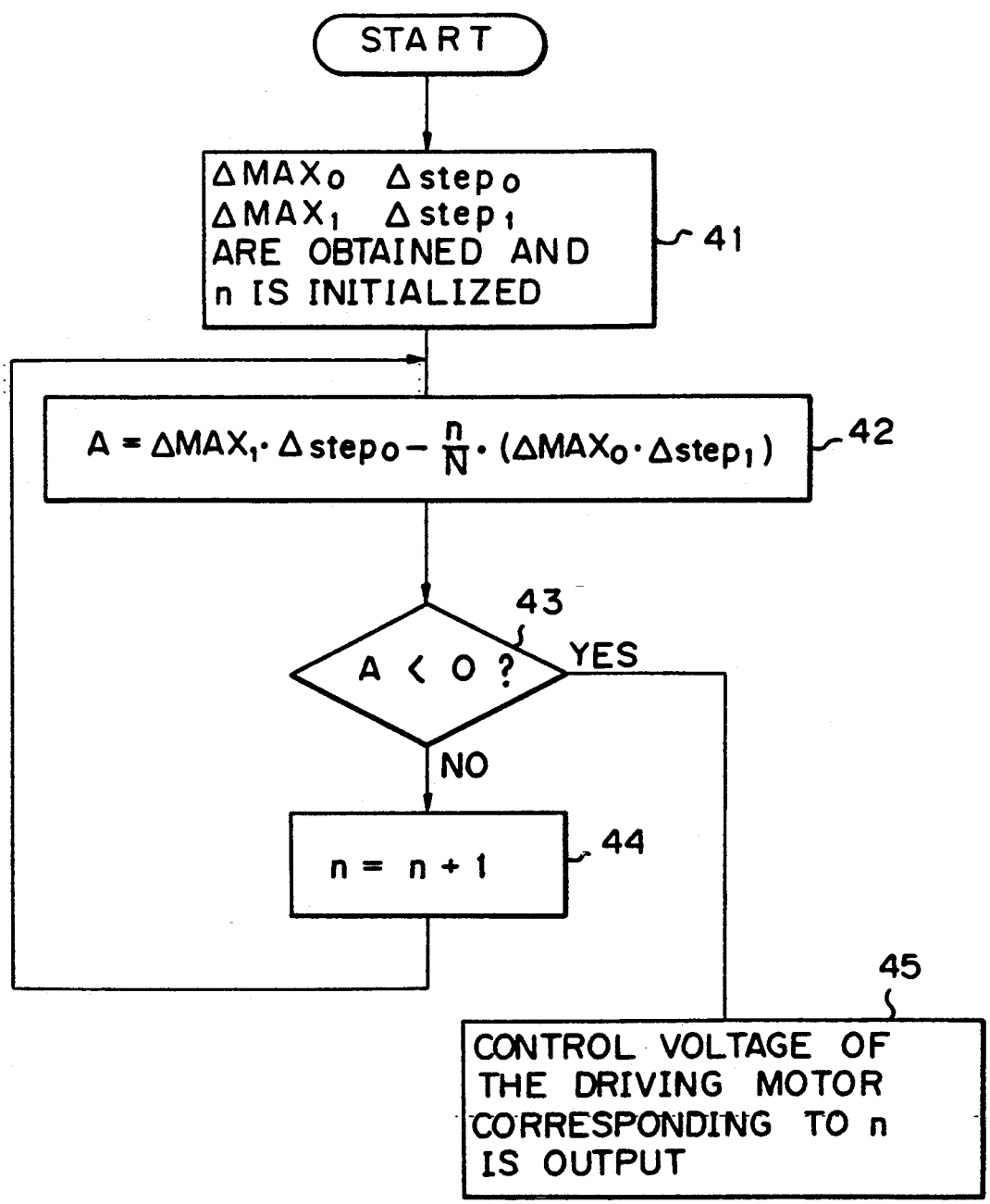
FIG. 7 is a flowchart useful in explaining the operation of the embodiment of FIG. 4.

FIG. 7 is a flowchart of a method for performing the arithmetic operation based on equation (3). In equation (3), in the case of obtaining n when A is equal to 0, as shown in FIG. 7, the differences $\Delta MAX_0$ and $\Delta MAX_1$ between the continuous evaluation value data and the movement distances $\Delta step_1$ and $\Delta step_0$ are first obtained and n is initialized in step 41. The calculation process of equation (3) is executed and the value of A is obtained in step 42. In step 43 a check is made to determine whether the value of A is 0 or less, and when the value of A is not 0 or less, n is increased by one in step 44 and the processing routine returns to step 42. When the value of A is 0 or less, a control voltage for lens drive motor 2 corresponding to the value of n at that moment is output in step 45.

By executing the foregoing processes to set the speed of rotation of lens drive motor 2, lens drive motor 2 is rotated at a low speed as the lens position approaches the maximum value of the evaluation value data, so that the amount of overrun or overshoot of the lens position is effectively reduced.

Figure 8:
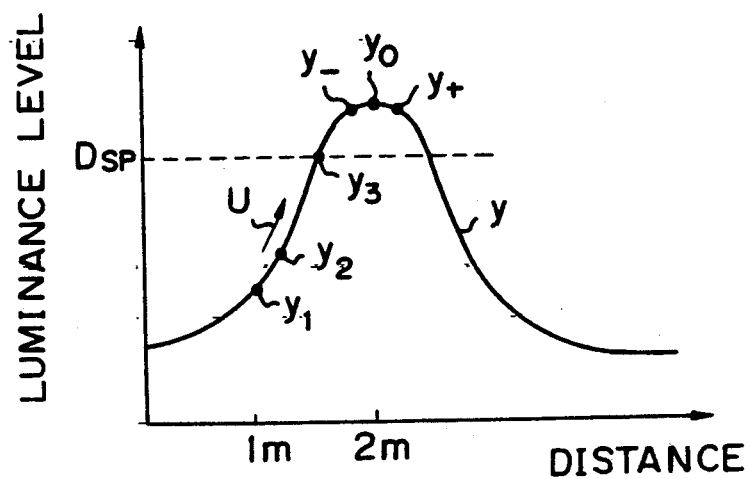
FIG. 8 is a graph useful in explaining another embodiment according to the present invention.

In another approach to focus control using the system of FIG. 4 according to the present invention, the luminance signal Y of the baseband signal extracted by signal processing circuit 4 from the image pickup signal output from the CCD image pickup device 3 is supplied to bandpass filter 5A. Thus, signal components having a frequency falling between 100 kHz and 4 MHz are extracted from the luminance signal Y by the bandpass filter 5A. The luminance signal components between 100 kHz and 4 MHz are converted into digital signals by A/D converter 8, and the data of all of the focus detecting points of one picture plane are integrated by integrating circuit 9. As an integration value in this case, for instance, assuming that an object to be photographed exists at a distance of 2 meters from the image pickup surface of the video camera and, thus, the the in-focus point is 2 meters, as shown in FIG. 8, there is obtained a characteristic curve y in which the integration value increases as the focusing ring 1a of lens 1 approaches the distance of 2 m, which is at the apex of the curve.

Now, assuming that the rotary position of focusing ring 1a is set at a point corresponding to a distance of 1 meter when the control circuit is turned on, the integration value $y_1$ is obtained in controller 10. At this time, controller 10 supplies a low-speed drive signal to lens drive motor 2 upon activation, so that focusing ring 1a is slightly rotated in both directions at a low speed. Controller 10 then discriminates whether the integration value increases when the focusing ring 1a is rotated in one of the two directions, and this discriminating operation is completed in 0.5 second.

After completion of this discrimination operation, focusing ring 1a is rotated in the increasing direction of the integration value under control of controller 10. In the example of FIG. 8, this is in the direction of arrow U to lengthen the distance of the focus position. At this time, since 0.5 seconds has passed from the activation just after the start of the operation in which the rotating direction was decided, a check is performed to determine whether the integration value has exceeded the threshold value Dsp and the motor rotating speed is controlled accordingly. For instance, in the example of FIG. 8, when 0.5 seconds passed from the activation, assuming that the integration value is set to $y_2$ lower than the threshold value Dsp, controller 10 supplies a high speed drive signal to lens drive motor 2, thereby rotating focusing ring 1a at a high speed.

When the focus position approaches 2 meters due to the rotation of the lens and the integration value exceeds a value $y_3$ at the threshold value Dsp, controller 10 supplies a low speed drive signal to lens drive motor 2, thereby rotating focusing ring 1a at a low speed. By such low speed rotation, it is detected that the integration value is set to the maximum value $y_0$ corresponding to the distance of 2 meters. At this time, by detecting the integration value y+ in which focusing ring 1a exceeded the distance 2 meters and slightly decreased from the maximum value $y_0$, controller 10 determines that the integration value $y_0$ at the distance 2 meters is the maximum value and it is determined that the position corresponding to 2 meters is the in-focus point. Focusing ring 1a is returned to the position corresponding to the distance of 2 meters at a low speed and is then stopped.

After the maximum integration value $y_0$ was detected, a check is made to determine whether the in-focus state continues. That is, focusing ring 1a is slightly rotated forward and backward at predetermined intervals. The integration values y− and y+ of the luminance components at the focus positions just before and after the position of 2 meters less than $y_0$ are detected, thereby confirming that the integration value $y_0$ at the distance 2 meters is the maximum value. It is decided that the in-focus state continues. Even when discriminating the in-focus state, since the integration value of the luminance component has exceeded the threshold value Dsp, focusing ring 1a is rotated at a low speed.

When it is detected by the in-focus discrimination that the lens position is not in the in-focus state, the circuit is again actived and the operation to search for the maximum value of the integration value of the luminance components mentioned above is executed.

According to the focus control circuit in this embodiment of the present invention, focusing ring 1a is rotated at a slow speed for 0.5 seconds, which is necessary to discriminate the correct rotation direction of focusing ring 1a. Therefore, the switching of the rotating direction upon activation or the like is smoothly executed by the small motion by the low speed. After the lapse of 0.5 seconds, at the low luminance level in the case of the threshold value Dsp or less where the possibility of the actual in-focus point is low, the focusing ring 1a is rotated at a high speed. Thus, the focus position approaches the in-focus point in a short time. At the high luminance level in the case of the threshold value Dsp or more at which the possibility of the in-focus point is high, the rotation of focusing ring 1a smoothes out and the focus position approaches the in-focus point in a short time. Thus, fluctuations of the in-focus point can be tracked more accurately.

According to the focus control system of the present invention, the speed of the lens drive motor is determined based upon the ratio of the gradient of the curve indicative of the relationship between the change in lens position and the change in evaluation value data at the continuous lens positions between the two end positions of the lens. Thus, when the lens position is far from the maximum value of the evaluation value data, the driving motor is rotated at a high speed and when the lens position approaches the maximum value of the evaluation value data, the driving motor is rotated at a low speed. By executing such control, peak detecting control can be performed at a high speed. The lens overrun amount when it is detected that the lens position has passed the point corresponding to the maximum value of the evaluation value data can be minimized by the peak detecting control.

According to the focus control circuit of the present invention, since the rotating speed of focusing ring 1a is controlled to the optimum state on the basis of the result of the detection of the integrated value of the luminance component in the image pickup signal, there are advantages such that the motion of the focusing ring becomes smooth, the focus position approaches the in-focus point in a short time, and the tracing capability to follow fluctuations of the in-focus point is improved.

The above description is given on preferred embodiments of the invention, but it will be apparent that many modifications and variations could be effected by one skilled in the art without departing from the spirit or scope of the novel concepts of the invention, which should be determined by the appended claims.

What is claimed is:

1. Focus control apparatus for a video camera in which a component of a video signal is maximized to perform focus control, comprising:

means for extracting a signal having a predetermined frequency component from a video signal;

means for moving a position of a lens in quest of an in-focus position at which said lens is correctly focused;

means for sampling the signal of predetermined frequency component extracted from the video signal at at least continuous, successive first, second, and third lens positions;

means for determining a first gradient indicative of a change in value of the signal of predetermined frequency component for a change in lens position between said first and second lens positions from the signal of the predetermined frequency component sampled at the first lens position and the signal of predetermined frequency component sampled at the second lens position;

means for determining a second gradient indicative of a change in value of the signal predetermined frequency component for a change in lens position between said second and third lens positions from the signal of the predetermined frequency component sampled at the second lens position and the signal of predetermined frequency component sampled at the third lens position; and control means responsive to a relationship between said first and second gradients for effecting relatively rapid movement of said lens when said lens is relatively distant from said in-focus position and relatively slow movement of said lens when said lens is relatively close to said in-focus position.

2. Focus control apparatus according to claim 1, wherein said mans for extracting a predetermined frequency component comprises bandpass filter means.

3. Focus control apparatus for a video camera in which a component of a video signal is maximized to perform focus control, comprising:

means for extracting a signal having a predetermined frequency component from a video signal;

means for moving a position of a lens;

means for sampling the signal of predetermined frequency component extracted from the video signal at at least continuous successive first, second, and third lens positions;

means for determining a first gradient indicative of a change in value of the signal of predetermined frequency component for a change in lens position between said first and second lens positions from the signal of the predetermined frequency component sampled at the first lens position and the signal of predetermined frequency component sampled at the second lens position;

means for determining a second gradient indicative of a change in value of the signal predetermined frequency component for a change in lens position between said second and third lens positions from the signal of the predetermined frequency component sampled at the second lens position and the signal of predetermined frequency component sampled at the third lens position; and means for controlling a speed of movement of said lens in response to a relationship between said first and second gradients;

wherein said means for extracting a predetermined frequency component comprises bandpass filter means;

and wherein said bandpass filter means includes a first bandpass filter and a second bandpass filter having a higher central frequency than said first bandpass filter, and further comprising means for selecting said first bandpass filter when an object forming the image of the video camera has a weak contrast, and selecting said second bandpass filter when said image has a strong contrast.

4. A method of focus control of a video camera wherein a video signal level from the camera is maximized by movement of the lens through continuous positions to an in-focus position at which said lens is correctly focused, comprising the steps of:

extracting a signal having a predetermined frequency component from the video signal;

sampling the extracted signal at at least three successive points corresponding to three respective lens positions;

deriving a first gradient indicative of a change in value between said extracted signal at a first sample point and a second sample point;

deriving a second gradient indicative of a change in value between said extracted signal between said second sample point and a third sample point;

comparing the first and second gradients; and controlling the speed of movement of the lens in response to the comparison in such a manner as to effect relatively rapid movement of said lens when said lens is relatively distant from said in-focus position and relatively slow movement of said lens when said lens is relatively close to said in-focus position.

5. A focus control system for automatically setting the lens of a video camera to an in-focus position at which said lens is correctly focused, comprising:

an image pickup element receiving an image through the lens of the video camera and producing an output signal therefrom;

a video signal processing circuit receiving said output signal from said image pickup element and producing a video signal including at least a luminance signal and a chrominance signal;

bandpass filter means receiving said luminance signal and extracting a signal therefrom having predetermined frequency components;

means for moving the lens over predetermined lens travel limits;

means for sampling the extracted signal at at least three sample points corresponding to three respective continuous lens locations;

means for producing a first gradient indicative of a change in value of the sampled, extracted signal at a first sample point and a second sample point and for producing a second gradient indicative of a change in value of the sampled, extracted signal at said second sample point and a third sample point;

means for comparing said first and second gradients and producing an output indicative of the comparison; and control means responsive to said output of said means for comparing for effecting relatively rapid movement of said lens when said lens is relatively distant from said infocus position and relatively slow movement of said lens when said lens is relatively close to said in-focus position.

* * * * *

UNITED STATES PATENT AND TRADEMARK OFFICE
CERTIFICATE OF CORRECTION

PATENT NO. : 5,005,086
DATED : April 2, 1991
INVENTOR(S) : Koji Iwamoto, Kenichi Hamada, Katsuaki Hirota It is certified that error appears in the above-identified patent and that said Letters Patent is hereby corrected as shown below:

```
Col. 1, line 12, change "obtaininq" to --obtaining--
Col. 3, line 43, change "last" to --least--
Col. 4, line 35, change "direction" to --directions--
```

In the Claims:

```
Col. 10, line 41, after "continuous" insert --,--
Col. 12, line 28, change "infocus" to --in-focus--
```

Signed and Sealed this

Twenty-ninth Day of December, 1992

*Attest:*

DOUGLAS B. COMER

*Attesting Officer*      Acting Commissioner of Patents and Trademarks